United States Patent
Kia et al.

(10) Patent No.: US 10,656,959 B2
(45) Date of Patent: May 19, 2020

(54) SHUTTING DOWN OF A VIRTUAL SYSTEM

(71) Applicant: Eaton Industries (France) SAS, Montbonnot St Martin (FR)

(72) Inventors: Emilien Kia, Pontcharra (FR); Aurelien Begou, Saint Martin d'Heres (FR)

(73) Assignee: EATON INTELLIGENT POWER LIMITED, Dublin (IE)

( * ) Notice: Subject to any disclaimer, the term of this patent is extended or adjusted under 35 U.S.C. 154(b) by 121 days.

(21) Appl. No.: 15/746,447

(22) PCT Filed: Jul. 14, 2016

(86) PCT No.: PCT/EP2016/066770
§ 371 (c)(1),
(2) Date: Jan. 22, 2018

(87) PCT Pub. No.: WO2017/012981
PCT Pub. Date: Jan. 26, 2017

(65) Prior Publication Data
US 2018/0203718 A1    Jul. 19, 2018

(30) Foreign Application Priority Data

Jul. 23, 2015    (GB) .................................. 1513039.6

(51) Int. Cl.
| | | |
|---|---|---|
| *G06F 9/455* | (2018.01) | |
| *G06F 9/48* | (2006.01) | |
| *G06F 9/44* | (2018.01) | |

(52) U.S. Cl.
CPC ............ *G06F 9/45558* (2013.01); *G06F 9/44* (2013.01); *G06F 9/485* (2013.01); *G06F 2009/45575* (2013.01)

(58) Field of Classification Search
None
See application file for complete search history.

(56) References Cited

U.S. PATENT DOCUMENTS

| | | |
|---|---|---|
| 8,438,563 B2 | 5/2013 | Yamaguchi et al. |
| 8,819,673 B1 | 8/2014 | Wilkinson et al. |
| (Continued) | | |

FOREIGN PATENT DOCUMENTS

| | | |
|---|---|---|
| EP | 2866143 A1 | 4/2015 |
| JP | 2014052687 A | 3/2014 |

OTHER PUBLICATIONS

IBM, Survival Guide for a Data Center Power Shutdown, IBM, 2013, 5 pages.*

(Continued)

*Primary Examiner* — Diem K Cao
(74) *Attorney, Agent, or Firm* — Leydig, Voit & Mayer, Ltd.

(57) ABSTRACT

A method for shutting down a virtual system including several virtual machines hosted by one or more physical servers includes the steps of: receiving a shutdown command for the virtual system or detecting an event that triggers a process for shutting down of the virtual system; sending a request for data about dependencies in the virtual system; retrieving the requested data; generating a sequence of shutdown actions depending on the retrieved requested data, the sequence including a shutting down of all applications executed by the virtual machines, the shutting down of all virtual machines, and then the shutting down of all virtual machine managers; and executing shutdown actions in the generated sequence in order to shut down the virtual system.

8 Claims, 3 Drawing Sheets

(56) References Cited

U.S. PATENT DOCUMENTS

| | | | |
|---|---|---|---|
| 8,910,156 B1 | 12/2014 | Kenchammana-Hosekote et al. | |
| 2005/0278700 A1 | 12/2005 | Buskens et al. | |
| 2009/0217072 A1* | 8/2009 | Gebhart | G06F 1/3203 |
| | | | 713/330 |
| 2009/0249354 A1 | 10/2009 | Yamaguchi et al. | |
| 2012/0233474 A1 | 9/2012 | Iwata | |
| 2012/0331465 A1* | 12/2012 | Tanikawa | G06F 9/5077 |
| | | | 718/1 |
| 2014/0359356 A1* | 12/2014 | Aoki | G06F 11/1441 |
| | | | 714/24 |
| 2014/0380079 A1 | 12/2014 | Katano et al. | |
| 2015/0193251 A1* | 7/2015 | Chu | G06F 9/485 |
| | | | 718/1 |
| 2016/0246270 A1* | 8/2016 | Lallement | G05B 17/02 |

OTHER PUBLICATIONS

Anonymous: "Datacenters need shutdown/startup order > boche.net—Vmware vEvangelist", May 18, 2015 (May 18, 2015), XP055301358.

* cited by examiner

SHUTTING DOWN OF A VIRTUAL SYSTEM

CROSS-REFERENCE TO PRIOR APPLICATIONS

This application is a U.S. National Phase application under 35 U.S.C. § 371 of International Application No. PCT/EP2016/066770, filed on Jul. 14, 2016, and claims benefit to British Patent Application No. 1513039.6, filed on Jul. 23, 2015. The International Application was published in English on Jan. 26, 2017 as WO 2017/012981 under PCT Article 21(2).

FIELD

The invention relates to shutting down of a virtual system comprising several virtual machines hosted by one or more physical server.

BACKGROUND

A virtual system comprising several virtual machines (VMs) or virtual servers may be for example applied in a datacenter comprising one or more physical servers (PSs) hosting the VMs. Shutting down of such a virtual system, particularly the PSs of the system, is problematic due to possible dependencies of the VMs. A shut down without taking the dependencies of the VMs into account can increase the risk of startup issues like hardware failures and may require a check of the disks storing the operating systems of the PSs and the VMs.

The U.S. Pat. No. 8,438,563B2 relates to a VM management program which causes a computer device for causing arbitrary VMs among a plurality of VMs implemented on a physical machine such as, e.g., a host machine to cooperate with each other to execute a control process to execute a process for managing the plurality of VMs, a management server device, and a method for managing a VM. This patent also describes a VM halt process, which considers dependencies between VMs when a halt start command for a selected VM is received.

SUMMARY

In an embodiment, the present invention provides a method for shutting down a virtual system comprising several virtual machines hosted by one or more physical servers, the method comprising the steps of: receiving a shutdown command for the virtual system or detecting an event that triggers a process for shutting down of the virtual system; sending a request for data about dependencies in the virtual system; retrieving the requested data; generating a sequence of shutdown actions depending on the retrieved requested data, wherein the sequence comprises a shutting down of all applications executed by the virtual machines, the shutting down of all virtual machines, and then the shutting down of all virtual machine managers; and executing shutdown actions in the generated sequence in order to shut down the virtual system.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
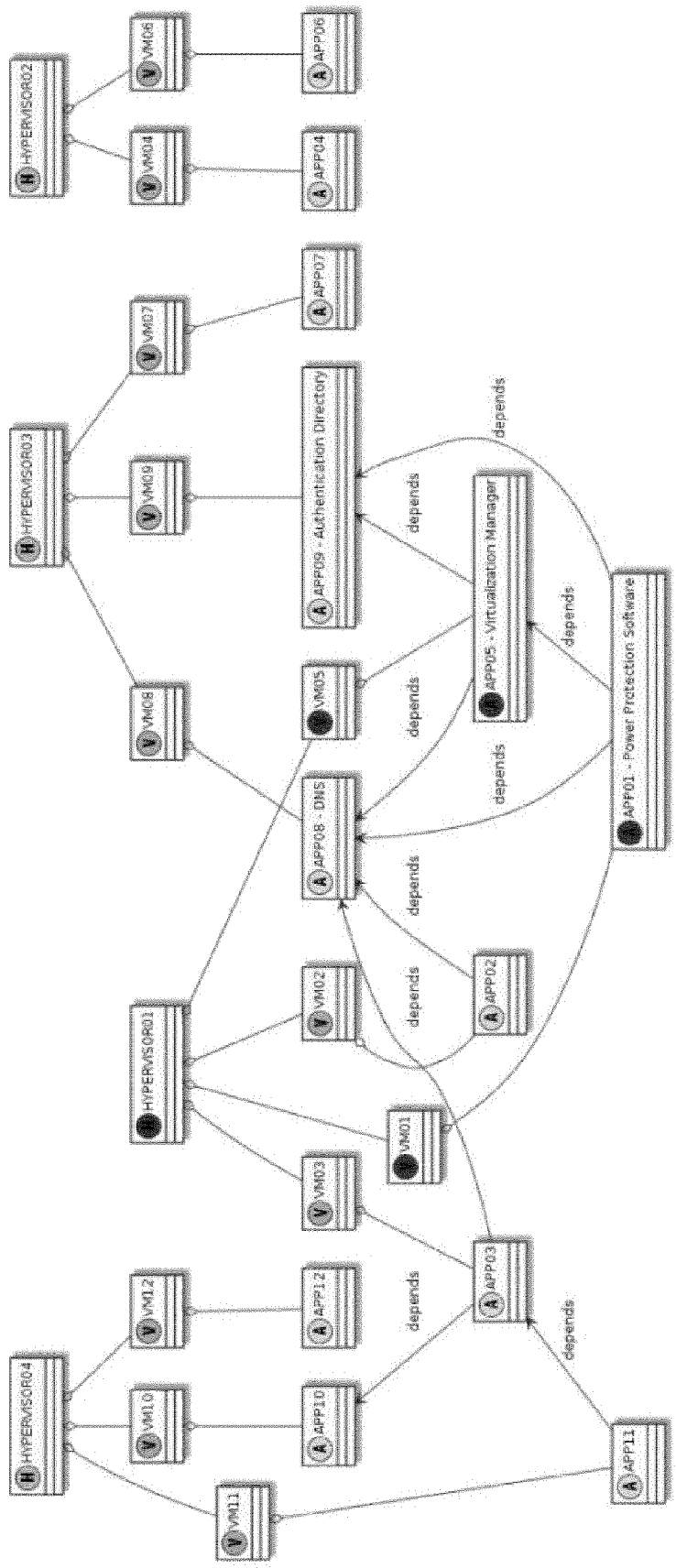
FIG. 1 shows an embodiment of a virtual system comprising 12 VMs hosted by one or more PSs and monitored by 4 VMMs with dependencies.

The term "virtual machine" used herein describes an emulation of a particular computer system. A VM in the context of the present invention can be a system VM, which completely substitutes a targeted real machine to be emulated.

The term "physical server" used herein describes an entity comprising a physical computer and software, which configures the physical computer to host one or more virtual machines.

The term "hypervisor" or "VM monitor" (VMM) used herein designates a software, which is executed by a PS and which can create, run or execute, and control VMs on the PS.

The term "host machine" used herein designates a PS executing a hypervisor.

The term "guest machine" used herein designates a VM created, executed and controlled by a host machine.

The term "virtualization manager" or "virtual machine manager" (VMMA) used herein designates a software that monitors and manages the hypervisor and virtual machines.

The term "power protection software" or "power application" (PA) used herein designates a software that monitors and manages power devices.

The term "virtual system" used herein designates a system comprising one or more PSs, each hosting at least one VM, and applications (or apps) executed by the VMs, wherein dependencies may exist between the applications and/or the VMs.

The present invention is based on the idea to consider the dependencies of the VMs, of apps executed by the VMs, and of the dependencies of the VMs with one or more VMMs (hypervisors) for determining a sequence for gracefully shutting a virtual system. Thus, the present invention provides to use data about dependencies in the virtual system such as dependencies of applications executed by VMs, dependencies of VMs, and dependencies with the VMMs in order generate a sequence of shutdown actions in order to gracefully shutdown the entire virtual system. Particularly, the dependencies of the VMs with the VMMs are considered, thus, allowing shutting down the entire virtual system so that the PSs hosting the virtual system can also be securely shutdown. The present invention can be applied as software, which can be connected to IT management platforms through networks and can detect or receive shutdown requests or events, which are configured to execute or trigger a shutdown process such as power failures, a high environmental temperature, an open door of a server rack. The inventive software can upon receipt of a shutdown request or detection of an event triggering a shutdown initiate the gracefully shutting down of a virtual system by determining a sequence of single shutdown actions for applications executed by VMs, VMs, and finally VMMs.

An embodiment of the invention relates to a method for shutting down of a virtual system comprising several virtual machines hosted by one or more physical server comprising the steps of receiving a shutdown command for the virtual system or detecting an event that triggers a process for shutting down of the virtual system, sending a request for data about dependencies in the virtual system particularly from at least one virtual machine manager, retrieving the requested data, particularly from the at least one virtual machine manager or another system such as a database or a data center infrastructure management (DCIM), generating a sequence of shutdown actions depending on the retrieved requested data, wherein the sequence comprises the shutting down of all applications executed by the virtual machines, the shutting down of all virtual machines, and then the shutting down of all virtual machine managers, and executing shutdown actions in the generated sequence in order to shut down the virtual system.

The shutting down of all applications executed by the virtual machines may comprise the shutting down of applications without dependencies until all applications executed by the virtual machines are shutdown.

The shutting down of all virtual machines may comprise executing an algorithm that chooses an optimal virtual machine manager configuration, a process that migrates automatically the existing and running virtual machines or a process that optimizes the placement of the virtual machines, and a task to allow the virtual machine managers to manage the shutdown of local virtual machines.

The shutting down of all virtual machine managers may comprise a simultaneous launch of a shutdown process of the virtual machine managers.

The one or more physical servers may be shut down after the virtual machine managers are shut down.

The method may further comprise a checking whether in the virtual system an automatic shutdown of virtual machines by a virtual machine manager is disabled, and if the automatic shutdown is disabled re-enabling the automatic shutdown of virtual machines by the virtual machine manager. Particularly, in high availability virtual environments the automatic shutdown of virtual machines when a virtual machine manager shuts down itself is usually disabled (for example VMWare® High Availability). Thus, it can be checked of this feature is disabled, and if so the feature can be re-enabled in order to allow a shutdown of the virtual system with to the inventive method.

A further embodiment of the invention relates to a computer program implementing a method of the invention and as described herein.

The computer program may be a protection application configured to receive shutdown commands or events triggering a shutdown process, to prepare and send a request for data about dependencies in the virtual system, to retrieve the requested data, to generate a sequence of shutdown actions depending on the retrieved requested data, wherein the sequence comprises the shutting down of all applications executed by the virtual machines, the shutting down of all virtual machines, and then the shutting down of all virtual machine managers, and to execute shutdown actions in the generated sequence in order to shut down the virtual system through the at least one virtual machine manager.

A yet further embodiment of the invention relates to a computer being configured by a computer program of the invention and as described herein to protect a virtual system.

According to a further embodiment of the invention, a record carrier storing a computer program according to the invention may be provided, for example a CD-ROM, a DVD, a memory card, a diskette, or a similar data carrier suitable to store the computer program for electronic access.

These and other aspects of the invention will be apparent from and elucidated with reference to the embodiments described hereinafter.

The invention will be described in more detail hereinafter with reference to exemplary embodiments. However, the invention is not limited to these exemplary embodiments.

In the following, functionally similar or identical elements may have the same reference numerals. Absolute values are shown below by way of example only and should not be construed as limiting the invention.

FIG. 1 shows a virtual system comprising 12 VMs VM01-VM12, which are hosted by one or more PSs and 4 VMMs HYPERVISOR01-HYPERVISOR04. Each VMM controls 4 VMs:

HYPERVISOR01 controls VMs VM01, VM02, VM03, VM05;
HYPERVISOR02 controls VMs VM04, VM06;
HYPERVISOR03 controls VMs VM07, VM08, VM09;
HYPERVISOR04 controls VMs VM10, VM11, VM12.

Each VM VM01-VM12 hosts one App. The VM VM01 hosts a "Power Protection Software" (PA) APP01, the VM VM05 hosts a "Virtualization Manager" (VMMA) APP05, the VM VM08 hosts the infrastructure service DNS (Domain Name Service) APP08, and the VM VM09 hosts the infrastructure service "Authentication Directory" APP09. The dependencies between the apps are shown in FIG. 1 by arrows designated with "depends". For example, APP11 depends on APP03, APP03 on APP10, APP03 on APP08, APP02 on APP08, APP01 on APP08, on APP09, and on APP05, APP05 on APP08, APP05 on APP09. The VMMA and the PA are executed as applications or apps, but could also be separate VMs. Since VMMS and/or PA are executed in the virtual system it is more complex to shut down the virtual system since VMMA and PA may not be simply shutdown as other apps in order to assure that the virtual system can be gracefully shutdown.

According to the present invention, for shutting down the virtual system of FIG. 1, first an aggregation of data and policies of the virtual system is performed, then dependencies links are built, and finally actions are executed directly through IT management platforms for shutting down the virtual system. The process of aggregating of data and policies from the virtual system is done by a request for data about dependencies in the virtual system. This request is sent to the virtual system, particularly to the VMMs, in the event of a shutdown of the virtual system, for example triggered manually or triggered by an event requiring a shutdown (e.g. a high environmental temperature in a datacenter, a power failure, for example when a Uninterruptable Power Supply detects a power failure and switches to battery supply, or any other event for example an open door in a data center rack etc.). In case of the system shown in FIG. 1, the requested data are then retrieved from the VMMs HYPERVISOR01-HYPERVISOR04. The requested data can also be retrieved from other sources for example a database containing the dependencies in the virtual system, or a DCIM. With the retrieved data, a sequence of shutdown actions is generated, which takes all dependencies in the virtual system into account as is now described in detail with reference to the flowchart shown in FIG. 2.

Figure 2:
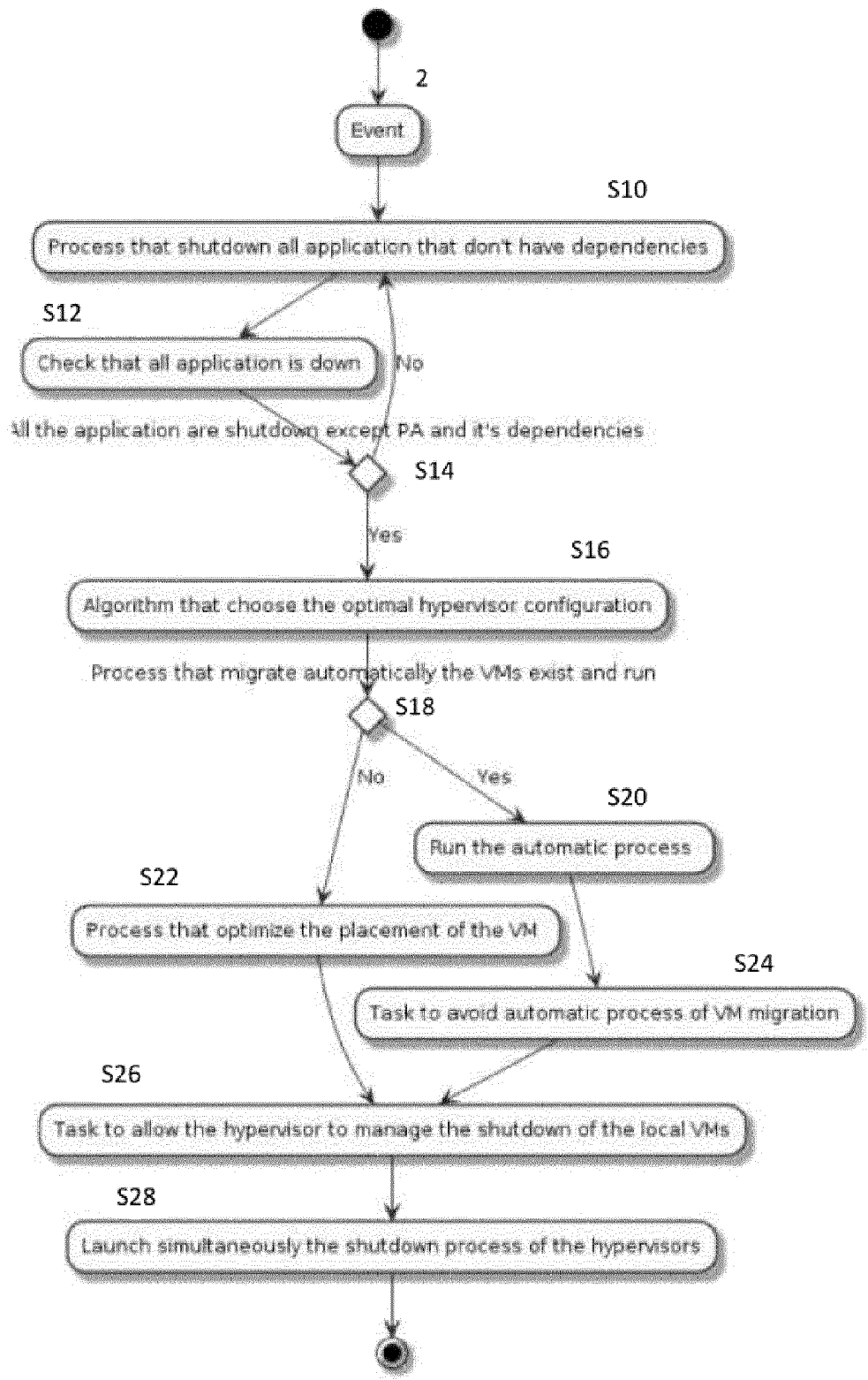
FIG. 2 shows a flowchart of an embodiment of a method for shutting down of the virtual system of FIG. 1 according to the invention.

The sequence of shutdown actions is generated by an algorithm with the flowchart shown in FIG. 2. The algorithm executes in step S10 a process for shutting down all applications that don't have dependencies through the VMMA: in the virtual system of FIG. 1, the apps APP04, APP06, APP07, APP12 do not have dependencies and are shut down by the process. Then, it is checked through the VMMA in step S12 whether all applications in the virtual system are shut down and the result is output. In step S14, the algorithm checks with the result whether all applications are shut down except the PA and its dependencies. If not yet all applications are shutdown, the algorithm goes back to step S10 in order to execute again the process for shutting down application without dependencies. This loop is executed as long as in step S14 the algorithm determines from the result that all application are shut down (except PA), and, then, continues with step S16, in which an algorithm is executed that chooses the optimal hypervisor configuration. In the following step S18, it is checked whether a process that migrates automatically the VMs exists and runs. If yes, the automatic process is run in step S20 and thereafter a task to avoid the automatic process of a VM migration is executed in step S24. If no, a process that optimizes the placement of the VMs is executed in step S22. In step S26, a task to allow the hypervisors to manage the shutdown of local VMs is executed. Then, in step S28 the shutdown process of the hypervisors is launched simultaneously in order to shut down the hypervisors and, thus, the entire virtual system. After shutting down the hypervisors in step S28, the PSs can finally be shut down.

Figure 3:
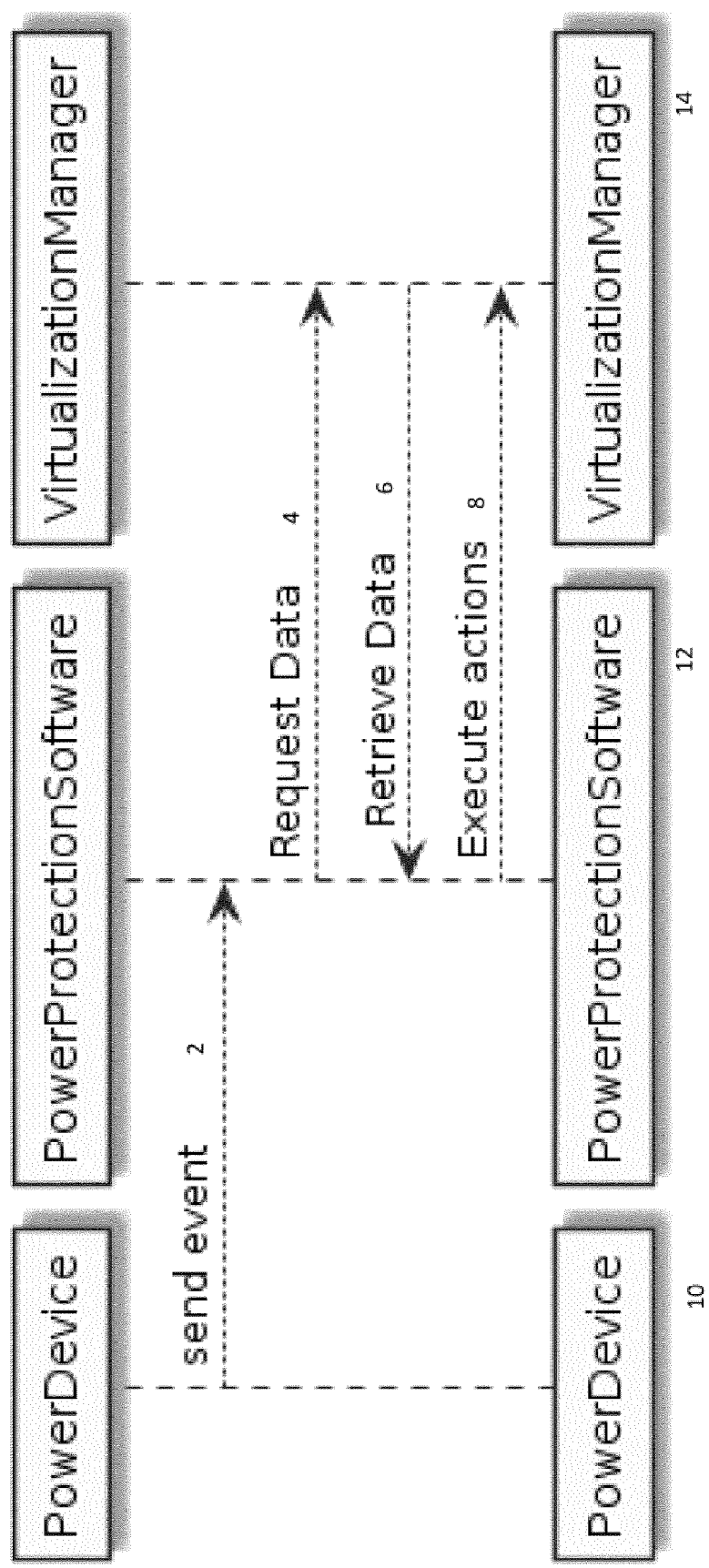
FIG. 3 shows an application of a computer program implementing a method for shutting down of a virtual system according to the invention.

FIG. 3 shows an application of the present invention embedded in a dedicated software that can be connected to IT management platforms through a network, retrieve data and policies, build dependencies to be able to run the actions properly, which are required to gracefully shutdown a virtual system as shown in the flowchart of FIG. 2. A power device 10 sends an event for shutting down a virtual system to the dedicated software 12 implementing a method according to the present invention. The dedicated software 12 then requests data from a Hypervisor manager 14, which retrieves the requested data and sends them back to the dedicated software 12. The software 12 then build from the received data and policies dependencies in order to be able to run the actions required for gracefully shutting down the virtual system as shown in FIG. 2 and described above. For shutting down, the dedicated software 12 executed the required actions via the Hypervisor manager.

The present invention is particularly suitable for application in datacenters in order to securely shutting down of virtual systems comprising several VMs hosted by one or more PS. Particularly, the present invention is able to protect a full virtualized environment when a protection application and all infrastructure services are hosted by VMs.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS AND ABBREVIATIONS 2 shutdown event/command
4 request for data
6 retrieved data
8 execute actions
10 power device
12 dedicated software
14 VMM
DCIM Data Center Infrastructure Management
DNS Domain Name Service
PA Power Application
PS Physical Server
VM Virtual Machine
VMM Virtual Machine Monitor (Hypervisor)
VMMA Virtual Machine Manager

The invention claimed is:

1. A method for shutting down a virtual system comprising several virtual machines hosted by one or more physical servers and one or more virtual machine managers, each virtual machine manager controlling one or more virtual machines, and each virtual machine hosting an application, at least one of the applications depending on at least another application, at least one application comprising a power protection software that monitors and manages power devices, at least one application comprising a virtualization manager comprising a software that monitors and manages the virtual machines and the virtual machine manager, the method comprising the steps of:

receiving a shutdown command for the virtual system or detecting an event that triggers a process for shutting down of the virtual system;

sending a request for data about dependencies in the virtual system;

retrieving the requested data, which comprise dependencies of the applications executed by the virtual machines, dependencies of the virtual machines, and dependencies with the virtual machine managers;

generating a sequence of shutdown actions depending on the retrieved requested data, wherein the sequence comprises a shutting down of all applications executed by the virtual machines, comprising the shutting down of applications without dependencies, checking through the virtualization manager whether all applications in the virtual system are shut down and outputting a result, checking the result for whether all applications are shut down except the power protection software and its dependencies, and repeating the previous steps until it is determined that all applications are shut down except the power protection software; the shutting down of all virtual machines; and then the shutting down of all virtual machine managers; and executing shutdown actions in the generated sequence in order to shut down the virtual system.

2. The method of claim 1, wherein the shutting down of all virtual machines comprises executing an algorithm that chooses an optimal virtual machine manager configuration, a process that migrates automatically the existing and running virtual machines or a process that optimizes a placement of the virtual machines, and a task to allow the virtual machine managers to manage the shutdown of local virtual machines.

3. The method of claim 1, wherein the shutting down of all virtual machine managers comprises a simultaneous launch of a shutdown process of the virtual machine managers.

4. The method of claim 1, wherein the one or more physical servers are shut down after the virtual machine managers are shut down.

5. The method of claim 1, further comprising checking whether in the virtual system an automatic shutdown of virtual machines by a virtual machine manager is disabled, and if the automatic shutdown is disabled, re-enabling the automatic shutdown of virtual machines by the virtual machine manager.

6. A non-transitory computer-readable medium storing a computer program that, when implemented by a processor, is configured to perform the method of claim 1.

7. A computer being configured by the computer program of claim 6 to protect a virtual system.

8. A record carrier storing the computer program according to claim 6.

* * * * *